(12) United States Patent
Zalucki

(10) Patent No.: US 11,177,852 B1
(45) Date of Patent: Nov. 16, 2021

(54) DIGITAL DETECTION AND TRACKING OF SIGNALS OVER MULTIPLE FREQUENCY BINS

(71) Applicant: BAE Systems Information and Electronic Systems Integration Inc., Nashua, NH (US)

(72) Inventor: Michael A. Zalucki, Hollis, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 17/027,901

(22) Filed: Sep. 22, 2020

(51) Int. Cl.
  *H04B 1/10* (2006.01)
  *H04B 1/71* (2011.01)
  *H04L 25/03* (2006.01)

(52) U.S. Cl.
  CPC .. *H04B 1/7102* (2013.01); *H04L 2025/03522* (2013.01)

(58) Field of Classification Search
  CPC ............. H04B 1/7102; H04L 2025/03522
  USPC ........................... 375/346, 348–350
  See application file for complete search history.

(56) References Cited

U.S. PATENT DOCUMENTS

| | | | | |
|---|---|---|---|---|
| 2005/0002473 A1* | 1/2005 | Kloper | ................ | G01R 23/16 375/316 |
| 2009/0207076 A1* | 8/2009 | Schipper | ............... | G01S 19/24 342/357.31 |
| 2012/0032854 A1* | 2/2012 | Bull | ..................... | H04K 3/224 342/450 |
| 2014/0106697 A1* | 4/2014 | Wang | .................. | G01S 19/21 455/307 |
| 2020/0141997 A1* | 5/2020 | Laika | ................... | G01R 23/15 |

\* cited by examiner

*Primary Examiner* — Don N Vo
(74) *Attorney, Agent, or Firm* — Finch & Maloney PLLC; Scott J. Asmus

(57) ABSTRACT

Techniques are provided for tracking of signals. A methodology implementing the techniques according to an embodiment includes filtering a first segment of an input signal, associated with a first time interval, into a first plurality of frequency bins. The method also includes detecting a signal of interest (SOI) in one of the first plurality of frequency bins. The method further includes filtering a second segment of the input signal, associated with a second time interval, into a second plurality of frequency bins. The method further includes determining movement of the SOI from a first frequency bin, of the first plurality of frequency bins, to a second frequency bin, of the second plurality of frequency bins. The method further includes tracking the SOI based on the movement determination. In some cases, the method further includes creating a composite signal based on the tracking over multiple frequency bins and multiple time intervals.

20 Claims, 10 Drawing Sheets

DIGITAL DETECTION AND TRACKING OF SIGNALS OVER MULTIPLE FREQUENCY BINS

STATEMENT OF GOVERNMENT INTEREST

This invention was made with United States Government assistance. The United States Government has certain rights in this invention.

FIELD OF DISCLOSURE

The present disclosure relates to signal processing, and more particularly, to digital detection and tracking of signals from a filter bank.

BACKGROUND

In receiver applications it is often necessary to detect and track a signal over time. This can be difficult in cases where the signal is frequency modulated with unknown bandwidth and/or modulation type. Additionally, in real world applications, the presence of other interfering signals and noise creates additional challenges for detection and tracking.

Figure 1:
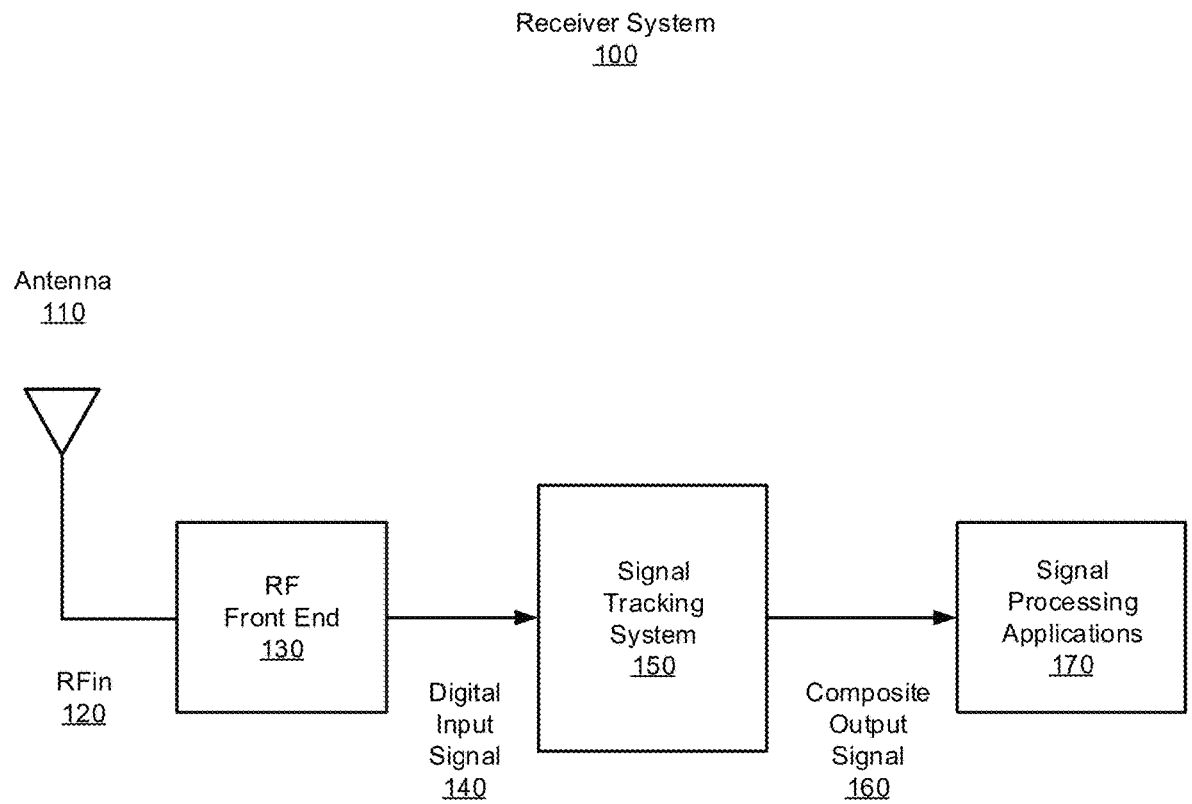
FIG. 1 illustrates deployment of a signal tracking system in a receiver, in accordance with certain embodiments of the present disclosure.

Although the following Detailed Description will proceed with reference being made to illustrative embodiments, many alternatives, modifications, and variations thereof will be apparent to those skilled in the art.

DETAILED DESCRIPTION

Techniques are provided for digital tracking of signals over time and frequency through the use of a filter bank. As noted previously, it can be difficult to detect and track a signal over time, when the signal is frequency modulated with unknown bandwidth and/or modulation type, particularly in the presence of noise and other interfering signals. Embodiments of the present disclosure employ a filter bank to separate a digital input signal (e.g., a received radio frequency (RF) signal) into multiple frequency bins which are then scanned for a signal of interest (SOI). The filter bank may be implemented, for example, as a discrete time Fourier transform (DTFT). When an SOI is found, it can be tracked across multiple bins in both time and frequency, as described in greater detail below. Knowing which bins the signal is in at any given time allows for the creation of a composition of the signal using the data from multiple bins. This can reduce the impact of interference on the SOI by selectively choosing bins that do not contain, or at least reduce, interference. The disclosed techniques can also be used to more effectively recover SOIs without requiring prior knowledge of the characteristics of those SOIs, particularly if they are frequency modulated and span across several frequency bins. For example, a linear frequency modulated signal can be recovered by stitching together content from different frequency bins as the signal crosses bin boundaries. As such, the composite signal comprises data from multiple bins, wherein the best bin is dynamically selected at periodic points in time, based on chosen criteria, as will also be explained in greater detail below. This approach is an improvement over the use of a wide bandwidth filter to capture the entire frequency modulation range, since wide bandwidths allow for the introduction of greater interference and provide reduced processing gain and reduced sensitivity. Numerous variations will be apparent in light of this disclosure.

The disclosed techniques can be used in a wide variety of applications including, for example, space-based systems, communication systems, radars, and electronic warfare systems, although other applications will be apparent. In accordance with an embodiment, a methodology to implement these techniques includes filtering a first segment of an input signal, associated with a first time interval, into a first set of frequency bins. The method also includes detecting an SOI in one of the first set of frequency bins. The detection may be based on signal-to-noise ratio (SNR), signal to interference ratio, and other conditions, as will be described below. The method further includes filtering a second segment of the input signal, associated with a second time interval, into a second set of frequency bins. The method further includes determining movement of the SOI from a first frequency bin, of the first set of frequency bins, to a second frequency bin, of a different one of the second set of frequency bins. The method further includes repeating the process over multiple additional time intervals and tracking the SOI based on the move determinations and creating a composite signal based on the tracking over multiple frequency bins and multiple time intervals.

It will be appreciated that the techniques described herein may provide improved systems and methods for tracking of signals dynamically over time and frequency, compared to systems that require prior knowledge of the signal characteristics or that make an initial static frequency bin selection and stick with that selection, even as conditions change. Numerous embodiments and applications will be apparent in light of this disclosure.

System Architecture

FIG. 1 illustrates deployment of a signal tracking system 150 in a receiver 100, in accordance with certain embodiments of the present disclosure. The receiver system 100 is shown to include an antenna 110, an RF front end 130, a signal tracking system 150, and signal processing applications 170.

The antenna 110 is configured to provide RF input 120 to the RF front end 130. The RF front end 130 is configured to tune to a desired RF frequency and provide a digitized input signal 140 for processing by the signal tracking system 150. The operation of the signal tracking system 150, is described in greater detail below, but at a high-level, the system 150 is configured to detect and track SOIs that may be present in the digital input signal 140, over time and frequency, using a filter bank according to the disclosed techniques. A composite output signal 160 is generated as a combination of segments of the tracked SOI through multiple frequency bins over time. The composite output signal 160, is provided to signal processing applications 170 which may be configured to act on the detected SOI in any desired manner. For example, the SOI may be a communication signal that is further decoded to obtain a message, or the SOI may be identified as a threat that needs to be addressed in some manner.

Figure 2:
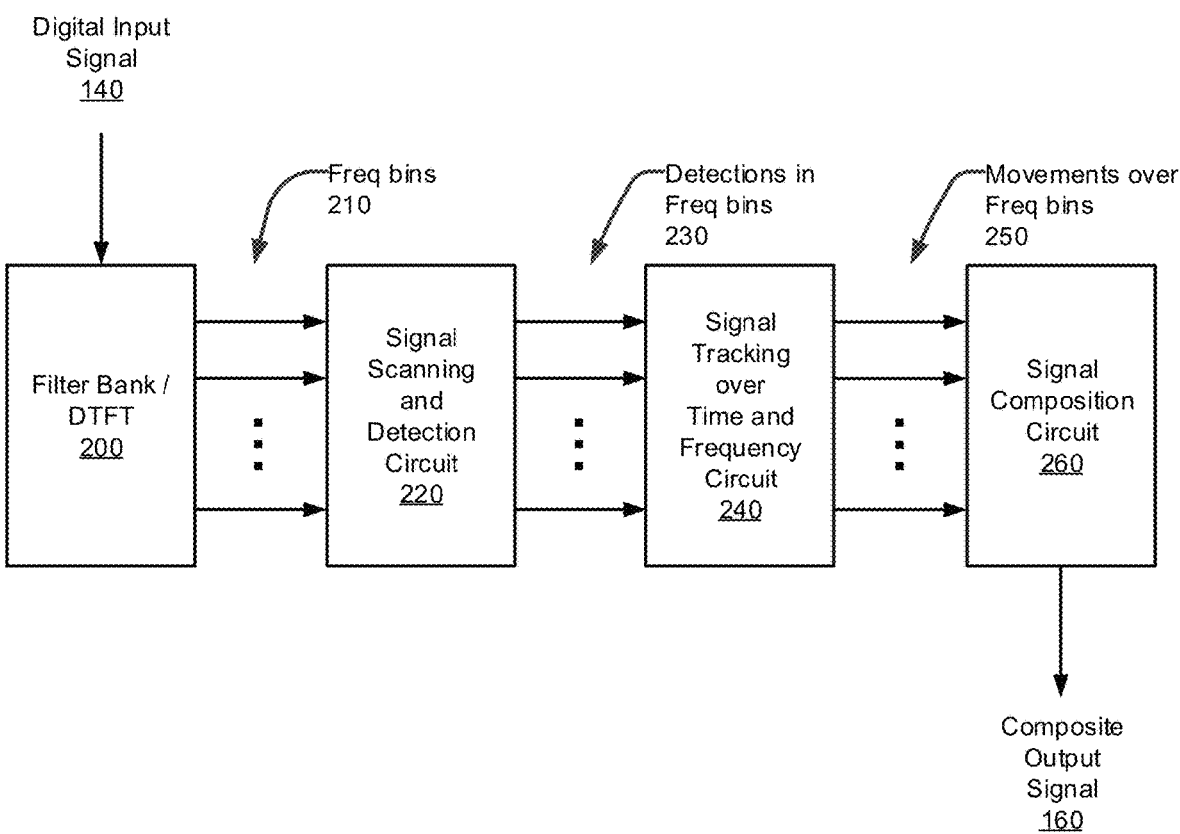
FIG. 2 is a block diagram of the signal tracking system, configured in accordance with certain embodiments of the present disclosure.

FIG. 2 is a block diagram of the signal tracking system 150, configured in accordance with certain embodiments of the present disclosure. The signal tracking system 150 is shown to include a filter bank or DTFT circuit 200, a signal scanning and detection circuit 220, a signal tracking circuit 240, and a composite signal generation circuit 260.

Filter bank or DTFT circuit 200 is configured to filter a first segment of an input signal into a first set of frequency bins and to filter a second segment of the input signal into a second set of frequency bins. The first segment is associated with a first time interval and the second segment is associated with a second time interval. While the following description refers to first and second segments, time intervals, and sets of frequency bins, the process is typically repeated for additional segments, intervals, and sets of bins as needed for the duration of tracking of one or more SOIs.

Figure 3:
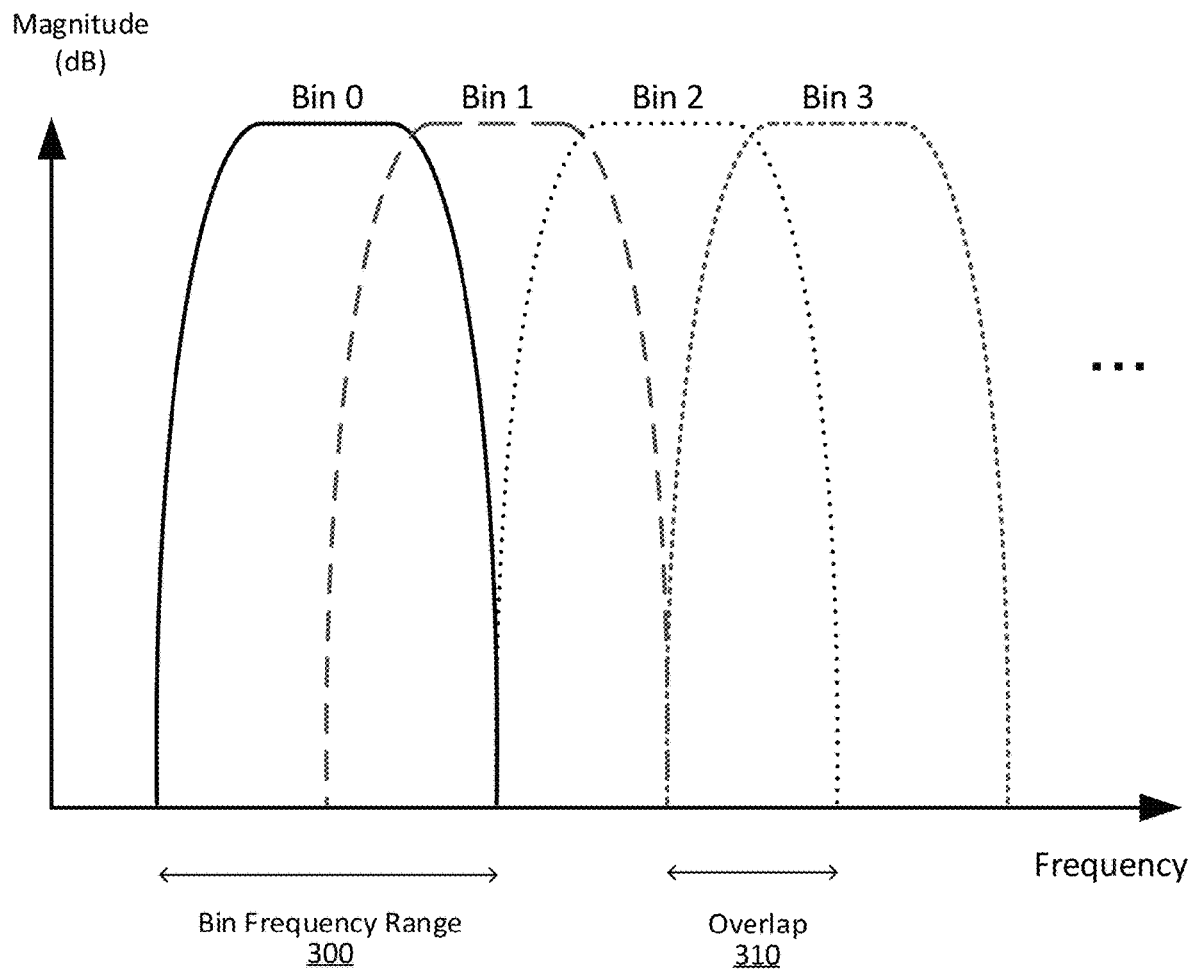
FIG. 3 illustrates frequency bins, in accordance with certain embodiments of the present disclosure.

FIG. 3 illustrates frequency bins 210, in accordance with certain embodiments of the present disclosure. As can be seen, each bin covers a certain frequency range 300, adjacent bins are filtered to adjacent or consecutive frequency ranges, and there may be overlap 310 between the bins in the transition regions of each filter. The filter response for each bin can be adjusted by applying different window filters to obtain the desired gain, ripple, and filter shape/width (which also affects the overlap between bins).

Signal scanning and detection circuit 220 is configured to detect an SOI 230 in one or more of the first set of frequency bins. In some embodiments, the detection of the SOI includes evaluating detection conditions that may include one or more of SNR measurements for the SOI, signal to interference ratio measurements for the SOI, amplitude measurements of the SOI, instantaneous frequency measurements of the SOI, and noise floor measurements of the bin. In some embodiments, the detection conditions may also be evaluated in adjacent frequency bins. The instantaneous frequency of a signal in a bin may be calculated from the measured phase data in that bin, for example as the change in phase over the unit of time that has passed between time intervals, added to the center frequency of the bin. In some embodiments, the SOI detection is based on evaluation of the detection conditions over a period of multiple time intervals.

In some embodiments, additional detection conditions may be imposed. For example, a new detection may only be allowed if there is not an existing tracked SOI in that bin, or in an adjacent or nearby bin. In some embodiments, a detection condition must be met (in the current or adjacent bins) for at least N time intervals within a window of M time intervals. The selected detection bin may be the bin with the highest amplitude for the greatest number of the N time intervals within the window M.

Signal tracking circuit 240 is configured to determine movement of the SOI 250 from a first frequency bin of the first set of frequency bins, to a second (e.g., different) frequency bin of the second set of frequency bins, and to track the SOI over time based on the move determination. The second frequency bin may be adjacent, or relatively close, to the first frequency bin. In some embodiments, a limit may be imposed on the number of bins that signal may move or jump in one time interval.

In some embodiments, the determination of movement of the SOI is based on identifying conditions that may include an increase of SNR of the SOI and/or an increase in amplitude of the SOI, in the second frequency bin relative to the first frequency bin. In some embodiments, the move condition must be met for at least N2 time intervals within a window of M2 time intervals. The ratio of N2 to M2 (for moves) may be chosen to be smaller than the ratio of N to M (for new detections) so that it is easier for moves to occur, to reduce signal fragmenting. The move conditions are similar to the detection conditions except that a lower SNR threshold may be used. Moving into a bin that already contains another signal may be allowed in some embodiments and will result in signals sharing the same bin. If two signals are sharing a bin, they can subsequently be split up through another move in which only the signal that moved into the existing signal would be allowed to move. This approach resolves ambiguities that arise when multiple signals share the same bin by assuming that the signal that originally moved onto the other signal is the same signal that is moving out.

In some other embodiments, the determination of movement of the SOI is based on measured amplitude and frequency of the tracked SOI in the second bin. In these embodiments, for every new time interval, all nearby bins are analyzed to determine if the SOI in any bin exceeds an amplitude threshold. Of those that exceed the threshold, the bin with a frequency closest to the expected frequency is chosen. The expected frequency is determined based on previously measured frequencies and measurements regarding frequency changes. Moving one signal onto another is once again allowed, however, in this case either signal can then move out so long as there is a bin that meets the move conditions.

This dynamic reevaluation of selected frequency bins for the signal of interest provides increased resilience to interference, improved performance for receiving frequency modulated signals, and improved ability to receive signals with unknowing bandwidth and/or modulation.

Signal tracking circuit 240 is also configured to terminate the status of SOI as a signal of interest based on evaluation of termination conditions which indicate that the SOI no longer exists or is otherwise no longer detectable within a given bin at a given time interval. In some embodiments, the termination conditions may include the measured SNR and/or amplitude for the SOI. In some embodiments, the termination conditions may also include expiration of a timer, which is initialized on the detection of the SOI. The timer may serve to limit the time duration over which an SOI is to be tracked. In some embodiments, the termination conditions must be met for at least N3 time intervals within a window of M3 time intervals. The ratio of N3 to M3 may be chosen to be larger than the ratio of N2 to M2 (for move detections), again so that it is easier for moves to occur, to reduce signal fragmenting.

In some embodiments, only one operation may be allowed (i.e., new detection, move, or termination of SOI status) per bin per time interval. A priority scheme may be established for these operations, which can be configured for the needs of the application and may be based on the sizes of the selected N to M ratios for detection, move, and termination operations. If none of these operations are chosen for a given bin and time interval, then the current state of that bin will be maintained. For example, an SOI will continue to be tracked in the current bin.

In some embodiments, if there are two signals present in a bin then the SOI status of the signal that moved into that bin will terminate first, and the termination condition will be evaluated again on the next time interval at which point the SOI status of the other signal may terminate as well. This provides consistency with the rule allowing only one operation per bin per time interval, according to an embodiment.

Composite signal generation circuit 260 is configured to generate a composite tracked signal 160 based on the tracking of the SOI over multiple frequency bins, over a period of multiple time intervals.

Figure 4:
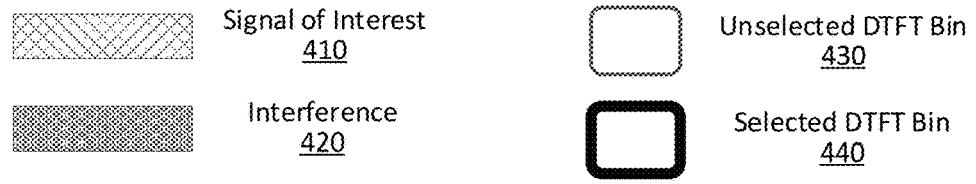
FIG. 4 illustrates frequency bin selection in the presence of interference, in accordance with certain embodiments of the present disclosure.
Figure 4:
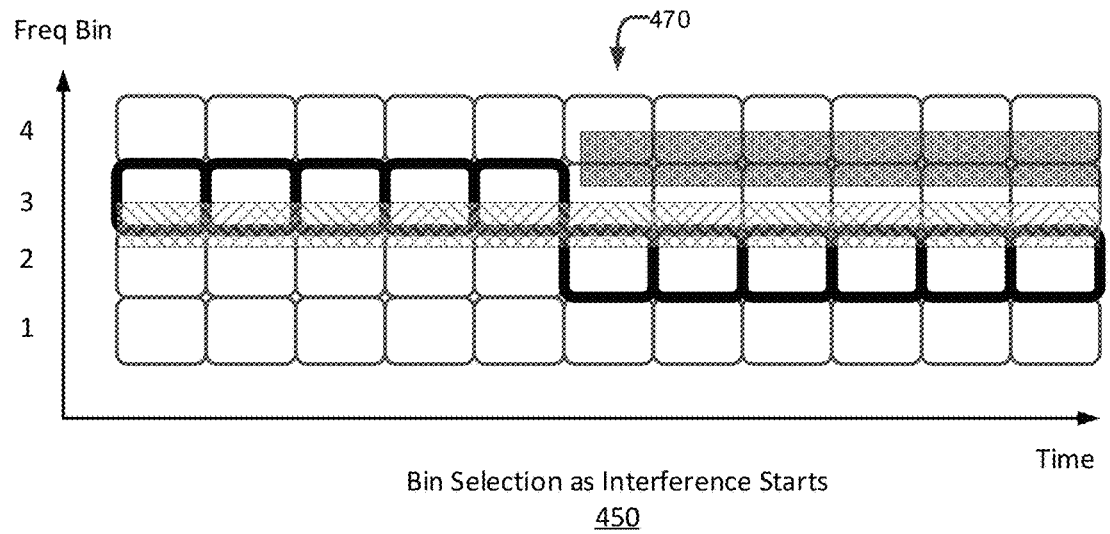
Figure 4:
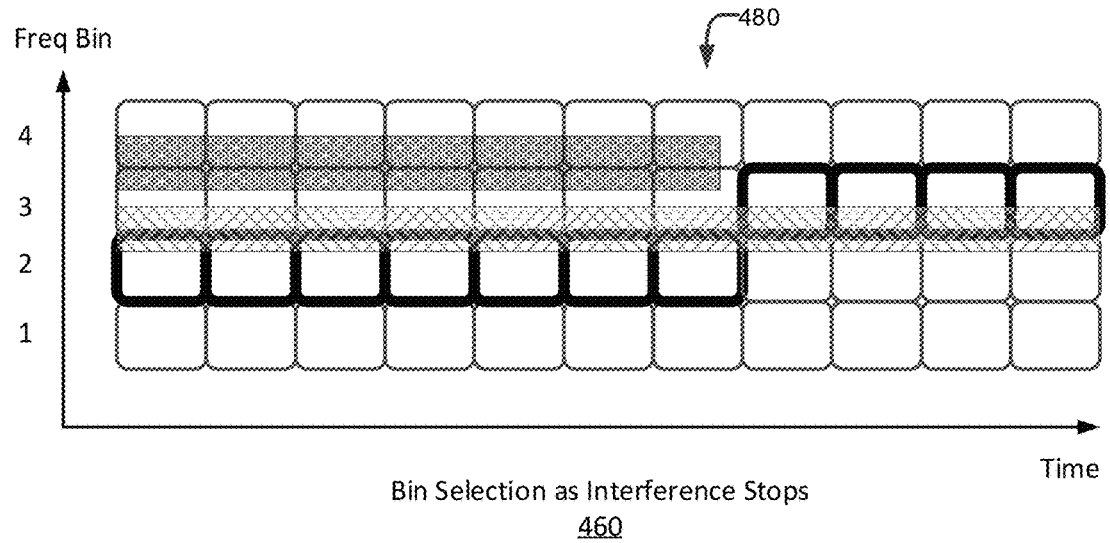

FIG. 4 illustrates frequency bin selection 400 in the presence of interference, in accordance with certain embodiments of the present disclosure. Selected frequency (DTFT) bins 440 (in which the SOI is determined to be located) are shown along with unselected bins 430 over a range of time segment intervals. An SOI 410 is shown to persist at a relatively constant frequency, between frequency bins 2 and 4, over the full time range of interest and bin 3 is chosen as the selected bin because the SNR (or other detection condition) is most favorable in that bin. In plot 450, an interfering signal 420 is shown to begin at time segment 470, at a frequency located between bins 3 and 4. In response to this interfering signal, the signal tracking circuit 240 moves the selected frequency bin 440 from bin 3 to bin 2 so that it is further removed from the interference. In plot 460, at a later time segment 480, the interfering signal 420 terminates, and in response, the signal tracking circuit 240 moves the selected frequency bin 440 back to bin 3, which is once again the most favorable bin.

This capability to immediately switch to an adjacent bin if there is a change in the interfering signals present in the environment provides improved resilience to interference, compared to traditional receiver designs which choose an initial frequency bin and remain on that frequency for the duration of processing. The disclosed techniques work in part due to the overlap 310 in transition bands between adjacent bins, as shown in FIG. 3. Receiving a signal in the transition band is preferred when it has a greater signal-to-noise ratio (noise being the interferer in this case) than it would have in its adjacent bin.

Figure 5:
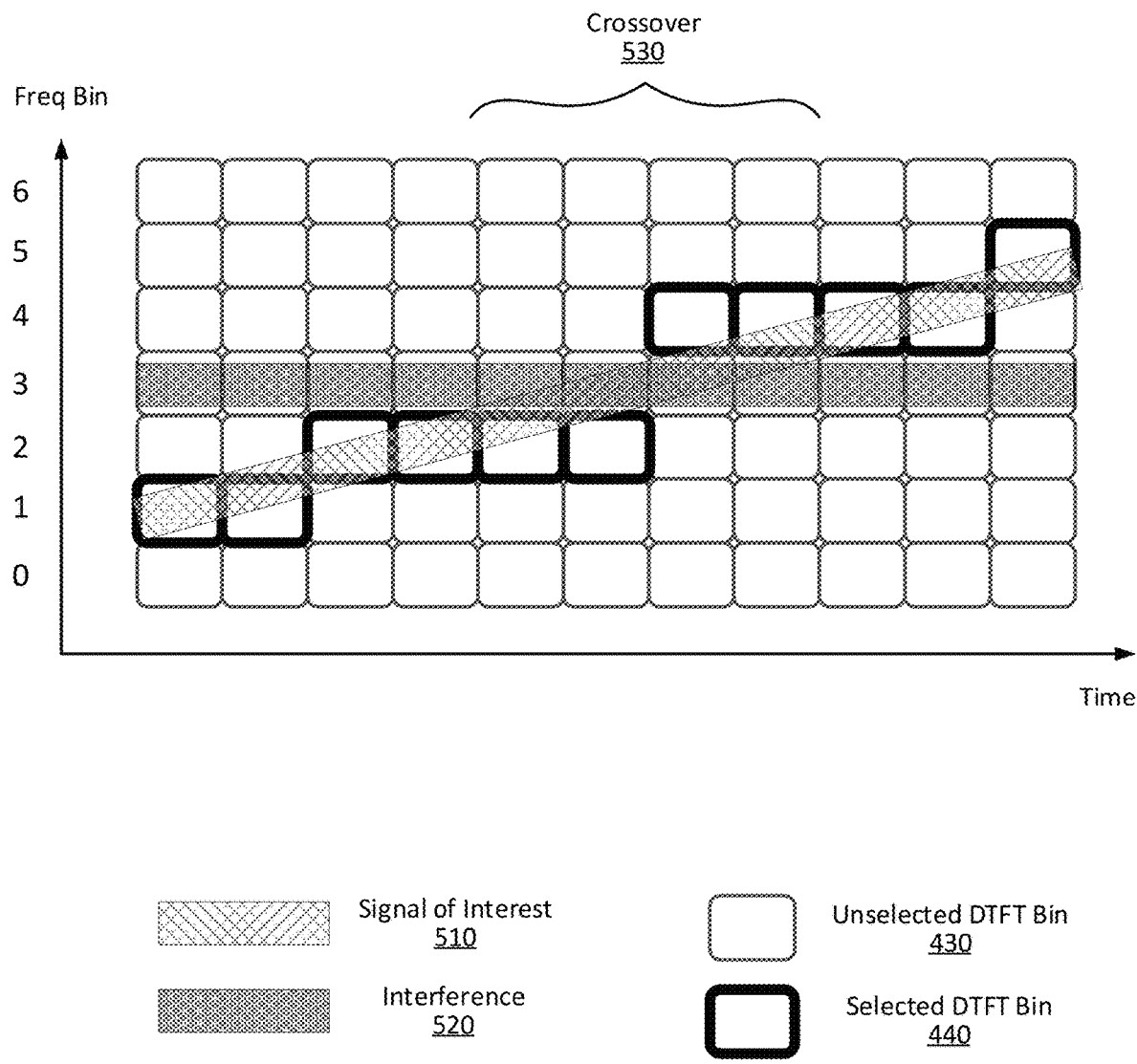
FIG. 5 illustrates frequency bin selection for a frequency modulated signal in the presence of interference, in accordance with certain embodiments of the present disclosure.

FIG. 5 illustrates frequency bin selection 500 for a frequency modulated signal in the presence of interference, in accordance with certain embodiments of the present disclosure. An SOI 510 is shown as a linearly frequency modulated signal that increases in frequency from frequency bin 1, at the first time segment interval, up to frequency bin 5 at the last time segment interval. An interfering signal 520 is also shown to persist at a relatively constant frequency at bin 3. As can be seen, the SOI passes through frequency bin 3, with a crossover 530 through the interfering signal, as part of the SOI modulation frequency sweep. In response to this interfering signal, the signal tracking circuit 240 causes the selected frequency bin to jump from bin 2 to bin 4 during the crossover to separate the SOI from the interfering signal. By selecting the best bin at each time interval, interfering signals can be filtered out to a large extent.

Figure 6:
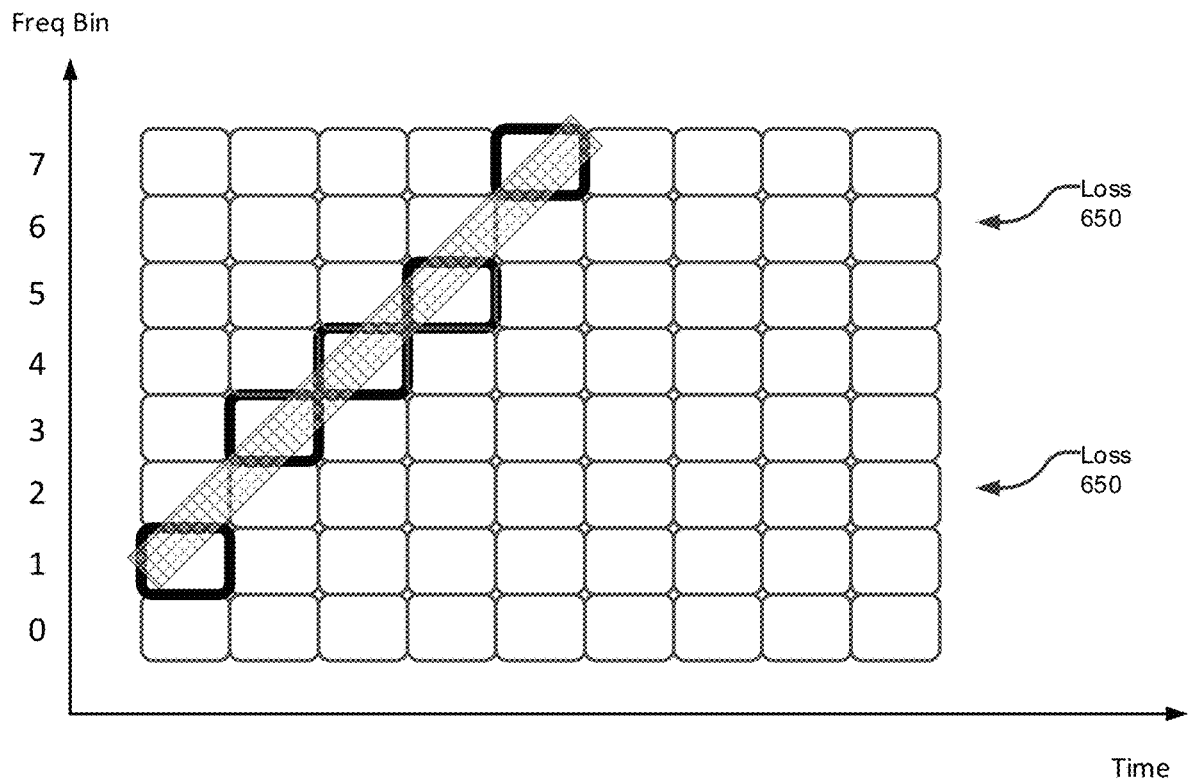
FIG. 6 illustrates loss due to fast signal modulation, in accordance with certain embodiments of the present disclosure.

The disclosed techniques provide additional advantages for receiving frequency modulated signals. Signals that cross bin boundaries due to their modulation are tracked and stitched back together, which allows for the reception of signals with bandwidths that are larger than the bin bandwidth, provided that the additional bandwidth is not instantaneous. Said differently, these techniques can be used to receive higher bandwidth signals so long as the frequency modulation is slow relative to the bin size and time interval sample rate. If the frequency modulation is too fast then some of that extra information may be lost for brief periods 650, as illustrated in FIG. 6. There is also a reduction in SOI amplitude that occurs due to the signal content being spread out across multiple frequency bins.

Figure 7:
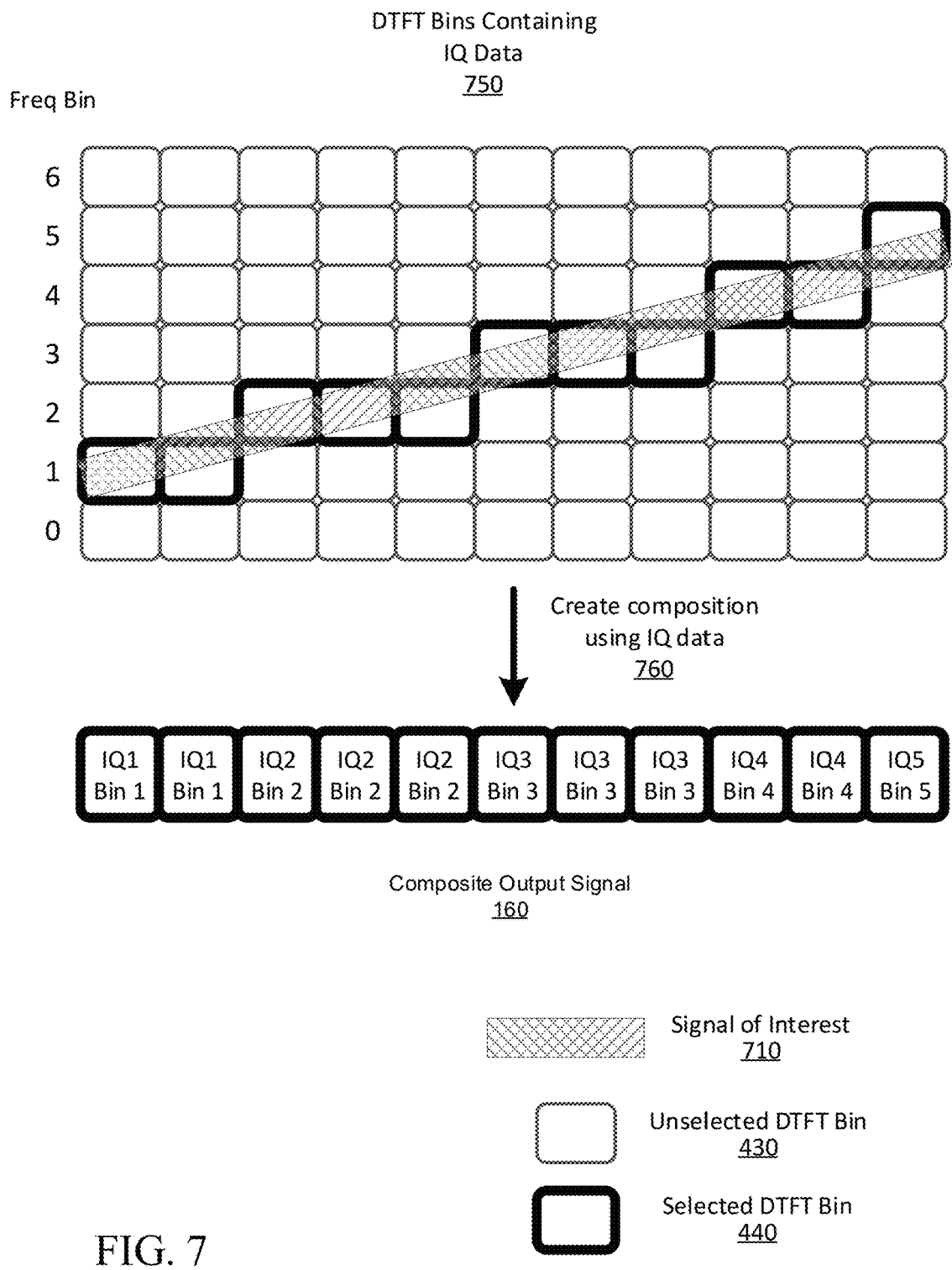
FIG. 7 illustrates the creation of a composite signal from multiple bins, in accordance with certain embodiments of the present disclosure.

FIG. 7 illustrates the creation 700 of a composite signal from multiple bins, in accordance with certain embodiments of the present disclosure. Each of the selected frequency bins 440 contains real and imaginary (i.e., in-phase (I) and quadrature (Q)) data 750 for the SOI 710 that passes through the bin. The data may equivalently be represented in magnitude and phase format. A composite output signal 160 may thus be formed 760 by stitching together or concatenating the IQ data from each of the selected frequency bins as shown. The frequency bin number from which each point of IQ data originated is also included as part of the composite signal. This frequency number in conjunction with the IQ data can be used to calculate the actual frequency of each sample or aid in the recreation of the original signal. In some embodiments, where it is not necessary to create the entire signal composition, the duration of the signal composition may be limited to time intervals that are of interest. For example, if only a pulse width is of interest in a particular application, then it is only necessary to construct the signal from the beginning of the pulse to the end of the pulse.

Embodiments of the disclosed technique provide an additional advantage of improved performance when receiving signals of unknown modulation type and/or bandwidth. The use of tracking over frequency bins provides greater flexibility in the selection of frequency bin size, allowing for smaller bins through which the signal can be tracked as it moves. Smaller bin sizes are preferable because they provide greater isolation from interference and higher processing gain which results in increased sensitivity. Without tracking, a larger bin size would be needed to provide assurance that the signal remains within the frequency range being examined.

In some embodiments, the signal tracking system 150 may comprise a bank of multiple detectors that are each configured to detect and track a different signal in the manner described above. This allows for multiple simultaneous detections. Each detector has knowledge of the operation of the other detectors so that duplicate detections can be avoided and so that signals can be tracked if they pass through one another.

Methodology

Figure 8:
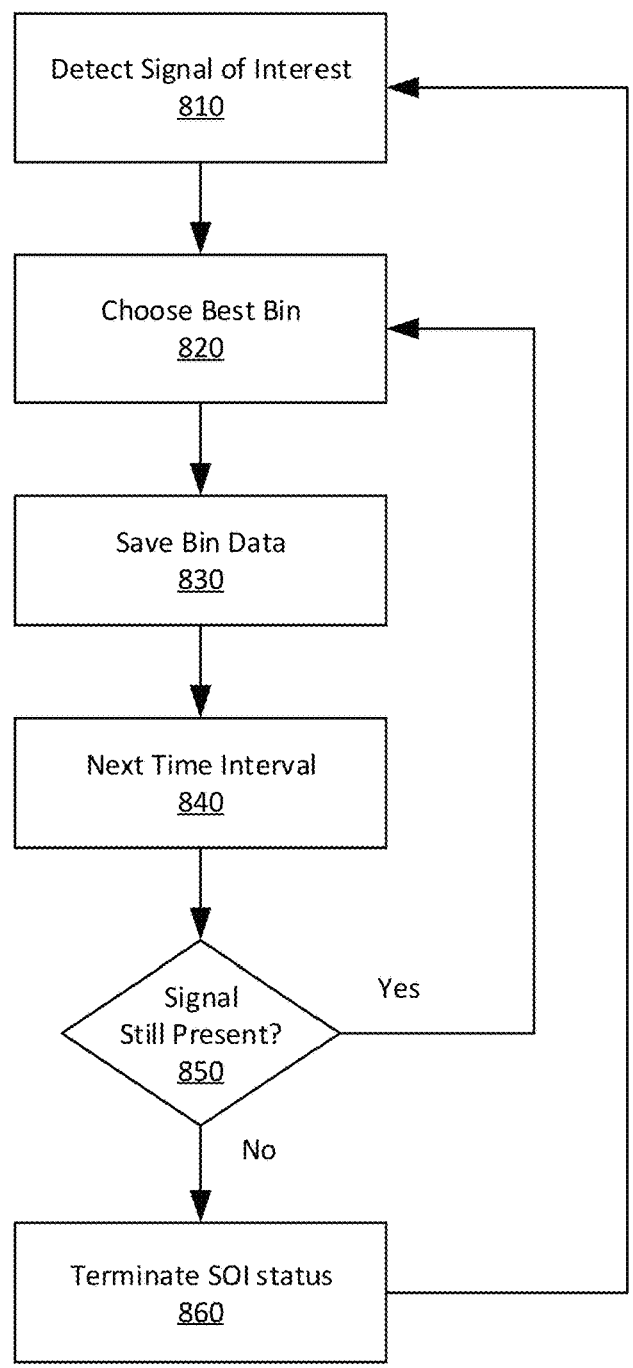
FIG. 8 is a flowchart illustrating a methodology for operation of the signal tracking system, in accordance with an embodiment of the present disclosure.
Figure 9:
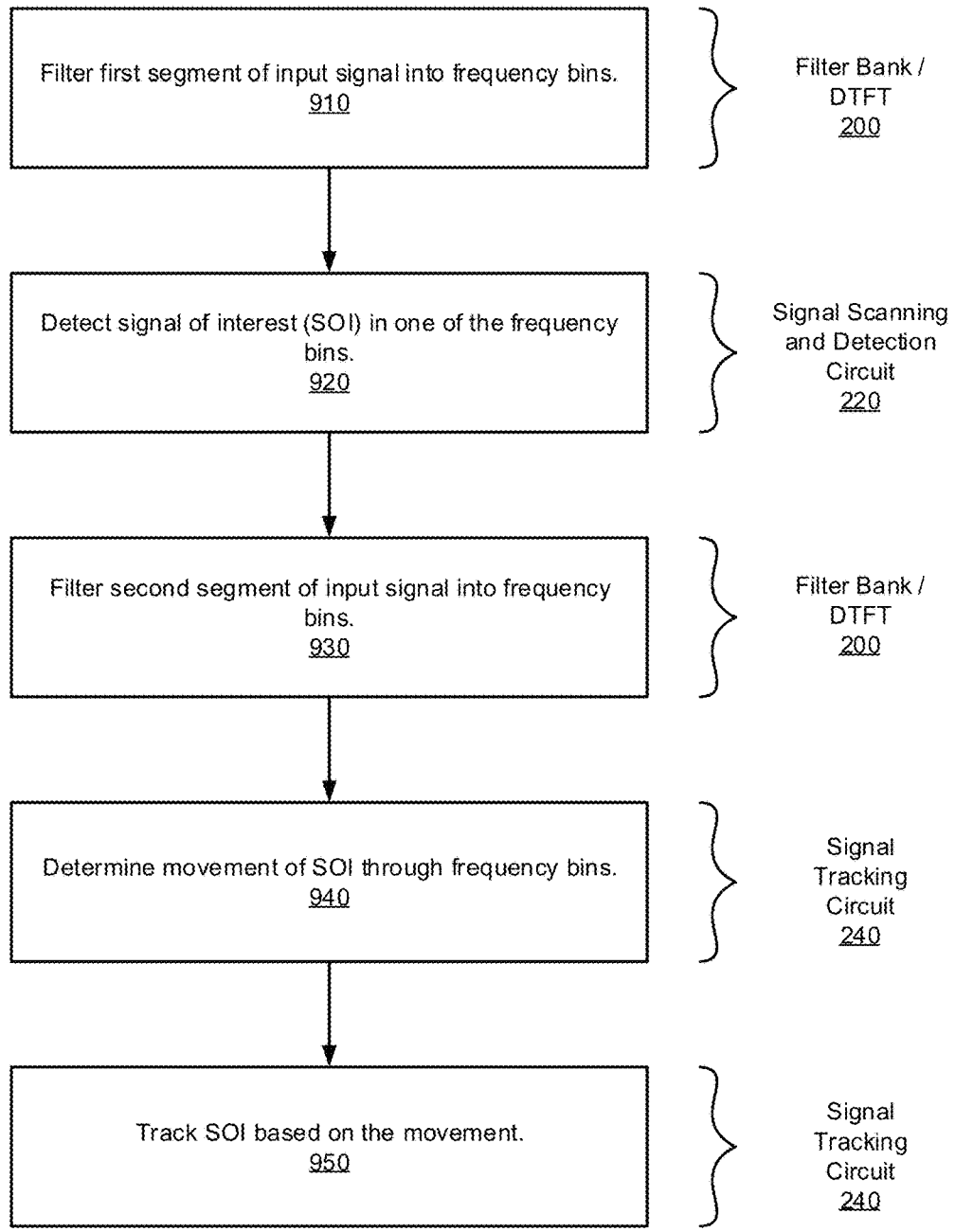
FIG. 9 is another flowchart illustrating a methodology for operation of the signal tracking system, in accordance with an embodiment of the present disclosure.

FIGS. 8 and 9 are flowcharts illustrating methodologies for operation of the signal tracking system, in accordance with an embodiment of the present disclosure. As can be seen, example methods 800 and 900 include a number of phases and sub-processes, the sequence of which may vary from one embodiment to another. However, when considered in aggregate, these phases and sub-processes form a process for signal tracking, in accordance with certain of the embodiments disclosed herein. These embodiments can be implemented, for example using the system architecture illustrated in FIGS. 1-7, as described above. However other system architectures can be used in other embodiments, as will be apparent in light of this disclosure. To this end, the correlation of the various functions shown in FIGS. 8 and 9 to the specific components illustrated in FIGS. 1-7 is not intended to imply any structural and/or use limitations. Rather other embodiments may include, for example, varying degrees of integration wherein multiple functionalities are effectively performed by one system. Numerous variations and alternative configurations will be apparent in light of this disclosure.

FIG. 8 illustrates a methodology for operation of the signal tracking system at a high level. In one embodiment, method 800 commences, at operation 810, by detecting a signal of interest (SOI) during a first time interval. Next, at operation 820, a frequency bin for the SOI is chosen based on one or more considerations, as previously described. At operation 830, the chosen bin is saved for subsequent tracking of the SOI. At operation 840, a new or next time interval is processed. At operation 850, if the signal is still present in the new time interval, the process continues by looping back to operation 820. Otherwise, at operation 860, the SOI status of the signal for the current bin at the current time interval is terminated. In some embodiments, this process may be performed for each of multiple signal detectors that are configured to operate in parallel.

FIG. 9 illustrates a methodology for operation of the signal tracking system at a more detailed level. In one embodiment, method 900 commences, at operation 910, by filtering a first segment of an input signal into a first set of frequency bins. The first segment is associated with a first time interval.

Next, at operation 920, an SOI is detected in one of the first set of frequency bins. In some embodiments, the detection of the SOI is based on the evaluation of detection conditions that include one or more of SNR for the SOI, signal to interference ratio for the SOI, and amplitude of the SOI. The detection conditions may be evaluated over a period of multiple time intervals to determine that the conditions are met (e.g., exceed the threshold values) for at least a certain percentage of those time intervals prior to declaring a detection.

At operation 930, a second segment of the input signal is filtered into a second set of frequency bins. The second segment is associated with a second time interval.

At operation 940, movement of the SOI from a first frequency bin to a second frequency bin is determined. The first frequency bin is the one of the first set of frequency bins and the second frequency bin is a different one of the second set of frequency bins. In some embodiments, the determination of movement of the SOI is based on identifying an increase of SNR of the SOI and/or an increase in amplitude of the SOI, in the second frequency bin relative to the first frequency bin. In some embodiments, the determination of movement of the SOI is based on amplitude and frequency of the SOI in the second bin.

At operation 950, the process is repeated over multiple additional time intervals and the SOI is tracked based on the move determinations over those time intervals.

Of course, in some embodiments, additional operations may be performed, as previously described in connection with the system. These additional operations may include, for example, terminating the SOI status of the SOI based on evaluation of termination conditions that include SNR for the SOI and expiration of a timer that was initialized on the detection of the SOI. In some embodiments, a composite signal is created based on the tracking of the SOI over multiple frequency bins over a period of multiple time intervals, by stitching together or otherwise combining content from those bins.

Example System

Figure 10:
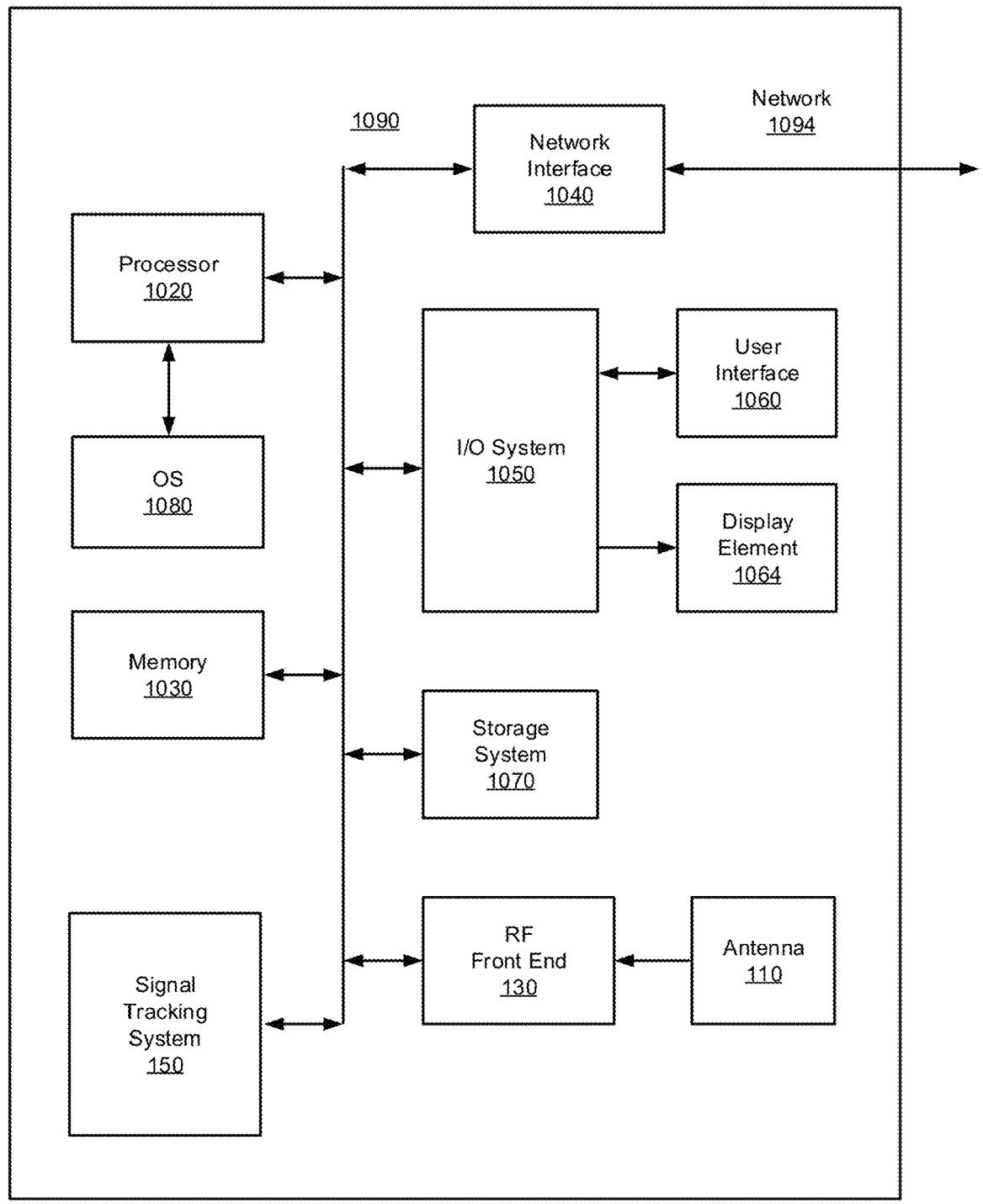
FIG. 10 is a block diagram schematically illustrating a processing platform configured to perform signal tracking, in accordance with an embodiment of the present disclosure.

FIG. 10 is a block diagram schematically illustrating a processing platform 1000 configured to perform tracking of signals, in accordance with an embodiment of the present disclosure. In some embodiments, platform 1000, or portions thereof, may be hosted on, or otherwise be incorporated into the electronic systems of an aircraft (or spacecraft, seagoing vessel, ground vehicle, or ground station), data communication device, personal computer, workstation, laptop computer, tablet, touchpad, portable computer, handheld computer, cellular telephone, smartphone, messaging device, embedded system, or any other suitable platform. Any combination of different devices may be used in certain embodiments.

In some embodiments, platform 1000 may comprise any combination of a processor 1020, a memory 1030, signal tracking system 150, a network interface 1040, an input/output (I/O) system 1050, a user interface 1060, a display element 1064, a storage system 1070, an antenna 110, and an RF frontend 130. As can be further seen, a bus and/or interconnect 1090 is also provided to allow for communication between the various components listed above and/or other components not shown. Platform 1000 can be coupled to a network 1094 through network interface 1040 to allow for communications with other computing devices, platforms, devices to be controlled, or other resources. Other componentry and functionality not reflected in the block diagram of FIG. 10 will be apparent in light of this disclosure, and it will be appreciated that other embodiments are not limited to any particular hardware configuration.

Processor 1020 can be any suitable processor, and may include one or more coprocessors or controllers, such as an audio processor, a graphics processing unit, or hardware accelerator, to assist in control and processing operations associated with platform 1000. In some embodiments, the processor 1020 may be implemented as any number of processor cores. The processor (or processor cores) may be any type of processor, such as, for example, a microprocessor, an embedded processor, a digital signal processor (DSP), a graphics processor (GPU), a tensor processing unit (TPU), a network processor, a field programmable gate array or other device configured to execute code. The processors may be multithreaded cores in that they may include more than one hardware thread context (or "logical processor") per core. Processor 1020 may be implemented as a complex instruction set computer (CISC) or a reduced instruction set computer (RISC) processor. In some embodiments, processor 1020 may be configured as an x86 instruction set compatible processor.

Memory 1030 can be implemented using any suitable type of digital storage including, for example, flash memory and/or random-access memory (RAM). In some embodiments, the memory 1030 may include various layers of memory hierarchy and/or memory caches as are known to those of skill in the art. Memory 1030 may be implemented as a volatile memory device such as, but not limited to, a RAM, dynamic RAM (DRAM), or static RAM (SRAM) device. Storage system 1070 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage 1070 may comprise technology to increase the storage performance enhanced protection for valuable digital media when multiple hard drives are included.

Processor 1020 may be configured to execute an Operating System (OS) 1080 which may comprise any suitable operating system, such as Google Android (Google Inc., Mountain View, Calif.), Microsoft Windows (Microsoft Corp., Redmond, Wash.), Apple OS X (Apple Inc., Cupertino, Calif.), Linux, or a real-time operating system (RTOS). As will be appreciated in light of this disclosure, the techniques provided herein can be implemented without regard to the particular operating system provided in conjunction with platform 1000, and therefore may also be implemented using any suitable existing or subsequently-developed platform.

Network interface circuit 1040 can be any appropriate network chip or chipset which allows for wired and/or wireless connection between other components of platform 1000 and/or network 1094, thereby enabling platform 1000 to communicate with other local and/or remote computing systems, servers, cloud-based servers, and/or other resources. Wired communication may conform to existing (or yet to be developed) standards, such as, for example, Ethernet. Wireless communication may conform to existing (or yet to be developed) standards, such as, for example, cellular communications including LTE (Long Term Evolution) and 5G, Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 1050 may be configured to interface between various I/O devices and other components of platform 1000. I/O devices may include, but not be limited to, user interface 1060 and display element 1064. User interface 1060 may include devices (not shown) such as a touchpad, keyboard, and mouse, etc. I/O system 1050 may include a graphics subsystem configured to perform processing of images for rendering on the display element 1064. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 1020 or any chipset of platform 1000.

It will be appreciated that in some embodiments, the various components of platform 1000 may be combined or integrated in a system-on-a-chip (SoC) architecture. In some embodiments, the components may be hardware components, firmware components, software components or any suitable combination of hardware, firmware or software.

Signal tracking system 150 is configured to track signals through frequency bins over time and generate a composite of the tracked signal, as described previously. Signal tracking system 150 may include any or all of the circuits/components illustrated in FIG. 2, as described above. These components can be implemented or otherwise used in conjunction with a variety of suitable software and/or hardware that is coupled to or that otherwise forms a part of platform 1000. These components can additionally or alternatively be implemented or otherwise used in conjunction with user I/O devices that are capable of providing information to, and receiving information and commands from, a user.

In some embodiments, these circuits may be installed local to platform 1000, as shown in the example embodiment of FIG. 10. Alternatively, platform 1000 can be implemented in a client-server arrangement wherein at least some functionality associated with these circuits is provided to platform 1000 using an applet, such as a JavaScript applet, or other downloadable module or set of sub-modules. Such remotely accessible modules or sub-modules can be provisioned in real-time, in response to a request from a client computing system for access to a given server having resources that are of interest to the user of the client computing system. In such embodiments, the server can be local to network 1094 or remotely coupled to network 1094 by one or more other networks and/or communication channels. In some cases, access to resources on a given network or computing system may require credentials such as usernames, passwords, and/or compliance with any other suitable security mechanism.

In various embodiments, platform 1000 may be implemented as a wireless system, a wired system, or a combination of both. When implemented as a wireless system, platform 1000 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, platform 1000 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the methodologies disclosed herein to be implemented. The instructions can be encoded using a suitable programming language, such as C, C++, object oriented C, Java, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments, the system may leverage processing resources provided by a remote computer system accessible via network 1094. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus, in other embodiments platform 1000 may comprise additional, fewer, or alternative subcomponents as compared to those included in the example embodiment of FIG. 10.

The aforementioned non-transitory computer readable medium may be any suitable medium for storing digital information, such as a hard drive, a server, a flash memory, and/or random-access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method, process, and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CD-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical entities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), desktop computers, laptop computers, tablet computers, servers, smartphones, etc. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

One example embodiment of the present disclosure provides a system for receiving a signal of interest (SOI), comprising: a filter bank configured to filter a first segment of an input signal into a first plurality of frequency bins, the first segment associated with a first time interval, and to filter a second segment of the input signal into a second plurality of frequency bins, the second segment associated with a second time interval; a signal scanning circuit configured to detect the SOI in a first frequency bin of the first plurality of frequency bins; and a tracking circuit configured to track movement of the SOI from the first frequency bin to a second frequency bin included in the second plurality of frequency bins, wherein the first frequency bin is different from the second frequency bin.

In some cases, the system comprises a composite signal generation circuit configured to generate a composite signal based on the tracking of the SOI over multiple frequency bins over a period of multiple time intervals, by combining signal information from those frequency bins. In some cases, the detection of the SOI comprises evaluating detection conditions that include signal to noise ratio for the SOI, signal to interference ratio for the SOI, amplitude of the SOI, or a combination of these, and the detection is based on evaluation of the detection conditions over a period of multiple time intervals. In some cases, the tracking circuit is further configured to: evaluate termination conditions that include signal to noise ratio for the SOI and expiration of a timer, the timer initialized on the detection of the SOI; and determine that the SOI is longer present in one or more frequency bins, based on the evaluated termination conditions. In some cases, the determination of movement of the SOI is based on identifying an increase of signal to noise ratio of the SOI and/or an increase in amplitude of the SOI, in the second frequency bin relative to the first frequency bin. In some cases, the determination of movement of the SOI is based on amplitude and frequency of the SOI in the second bin.

Another example embodiment of the present disclosure provides a computer program product including one or more machine-readable mediums encoded with instructions that when executed by one or more processors cause a process to be carried out for receiving a signal of interest (SOI), the process comprising: filtering a first segment of an input signal into a first plurality of frequency bins, the first segment associated with a first time interval; detecting the SOI in a first frequency bin of the first plurality of frequency bins; filtering a second segment of the input signal into a second plurality of frequency bins, the second segment associated with a second time interval; determining movement of the SOI from the first frequency bin to a second frequency bin included in the second plurality of frequency bins, wherein the first frequency bin is different from the second frequency bin; and tracking the SOI based on the movement determination.

In some cases, the detection of the SOI comprises evaluating detection conditions that include signal to noise ratio for the SOI, signal to interference ratio for the SOI, amplitude of the SOI, or a combination of these. In some such cases, the detection of the SOI is based on evaluation of the detection conditions over a period of multiple time intervals. In some cases, the process further comprises: evaluating termination conditions that include signal to noise ratio for the SOI and expiration of a timer, the timer initialized on the detection of the SOI; and determining that the SOI is longer present in one or more frequency bins, based on the evaluated termination conditions. In some cases, the determination of movement of the SOI is based on identifying an increase of signal to noise ratio of the SOI and/or an increase in amplitude of the SOI, in the second frequency bin relative to the first frequency bin. In some cases, the determination of movement of the SOI is based on amplitude and frequency of the SOI in the second bin. In some cases, the process further comprises creating a composite signal based on the tracking of the SOI over multiple frequency bins over a period of multiple time intervals and combining signal information from those frequency bins.

Another example embodiment of the present disclosure provides a method for receiving a signal of interest (SOI), the method comprising: filtering, by a processor-based system, a first segment of an input signal into a first plurality of frequency bins, the first segment associated with a first time interval; detecting, by the processor-based system, the SOI in a first frequency bin included in the first plurality of frequency bins; filtering, by the processor-based system, a second segment of the input signal into a second plurality of frequency bins, the second segment associated with a second time interval; determining, by the processor-based system, movement of the SOI from the first frequency bin to a second frequency bin included in the second plurality of frequency bins, wherein the first frequency bin is different from the second frequency bin; and tracking, by the processor-based system, the SOI based on the movement determination.

In some cases, the detection of the SOI comprises evaluating detection conditions that include signal to noise ratio for the SOI, signal to interference ratio for the SOI, amplitude of the SOI, or a combination of these. In some such cases, the detection of the SOI is based on evaluation of the detection conditions over a period of multiple time intervals. In some cases, the method further comprises: evaluating termination conditions that include signal to noise ratio for the SOI and expiration of a timer, the timer initialized on the detection of the SOI; and determining that the SOI is longer present in one or more frequency bins, based on the evaluated termination conditions. In some cases, the determination of movement of the SOI is based on identifying an increase of signal to noise ratio of the SOI and/or an increase in amplitude of the SOI, in the second frequency bin relative to the first frequency bin. In some cases, the determination of movement of the SOI is based on amplitude and frequency of the SOI in the second bin. In some cases, the method further comprises creating a composite signal based on the tracking of the SOI over multiple frequency bins over a period of multiple time intervals and combining signal information from those frequency bins.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not by this detailed description, but rather by the claims appended hereto. Future filed applications claiming priority to this application may claim the disclosed subject matter in a different manner and may generally include any set of one or more elements as variously disclosed or otherwise demonstrated herein.

What is claimed is:

1. A system for receiving a signal of interest (SOI), comprising:
   a filter bank configured to filter a first segment of an input signal into a first plurality of frequency bins, the first segment associated with a first time interval, and to filter a second segment of the input signal into a second plurality of frequency bins, the second segment associated with a second time interval;
   a signal scanning circuit configured to detect the SOI in a first frequency bin of the first plurality of frequency bins; and
   a tracking circuit configured to track movement of the SOI from the first frequency bin to a second frequency bin included in the second plurality of frequency bins, wherein the first frequency bin is different from the second frequency bin.

2. The system of claim 1, further comprising a composite signal generation circuit configured to generate a composite signal based on the tracking of the SOI over multiple frequency bins over a period of multiple time intervals, by combining signal information from those frequency bins.

3. The system of claim 1, wherein the detection of the SOI comprises evaluating detection conditions that include signal to noise ratio for the SOI, signal to interference ratio for the SOI, amplitude of the SOI, or a combination of these, and the detection is based on evaluation of the detection conditions over a period of multiple time intervals.

4. The system of claim 1, wherein the tracking circuit is further configured to:
   evaluate termination conditions that include signal to noise ratio for the SOI and expiration of a timer, the timer initialized on the detection of the SOI; and determine that the SOI is longer present in one or more frequency bins, based on the evaluated termination conditions.

5. The system of claim 1, wherein the determination of movement of the SOI is based on identifying an increase of signal to noise ratio of the SOI and/or an increase in amplitude of the SOI, in the second frequency bin relative to the first frequency bin.

6. The system of claim 1, wherein the determination of movement of the SOI is based on amplitude and frequency of the SOI in the second bin.

7. A computer program product including one or more non-transitory machine-readable mediums encoded with instructions that when executed by one or more processors cause a process to be carried out for receiving a signal of interest (SOI), the process comprising:
   filtering a first segment of an input signal into a first plurality of frequency bins, the first segment associated with a first time interval;
   detecting the SOI in a first frequency bin of the first plurality of frequency bins;
   filtering a second segment of the input signal into a second plurality of frequency bins, the second segment associated with a second time interval;
   determining movement of the SOI from the first frequency bin to a second frequency bin included in the second plurality of frequency bins, wherein the first frequency bin is different from the second frequency bin; and
   tracking the SOI based on the movement determination.

8. The computer program product of claim 7, wherein the detection of the SOI comprises evaluating detection conditions that include signal to noise ratio for the SOI, signal to interference ratio for the SOI, amplitude of the SOI, or a combination of these.

9. The computer program product of claim 8, wherein the detection of the SOI is based on evaluation of the detection conditions over a period of multiple time intervals.

10. The computer program product of claim 7, further comprising:
    evaluating termination conditions that include signal to noise ratio for the SOI and expiration of a timer, the timer initialized on the detection of the SOI; and
    determining that the SOI is longer present in one or more frequency bins, based on the evaluated termination conditions.

11. The computer program product of claim 7, wherein the determination of movement of the SOI is based on identifying an increase of signal to noise ratio of the SOI and/or an increase in amplitude of the SOT, in the second frequency bin relative to the first frequency bin.

12. The computer program product of claim 7, wherein the determination of movement of the SOI is based on amplitude and frequency of the SOI in the second bin.

13. The computer program product of claim 7, further comprising creating a composite signal based on the tracking of the SOI over multiple frequency bins over a period of multiple time intervals and combining signal information from those frequency bins.

14. A method for receiving a signal of interest (SOI), the method comprising:
   filtering, by a processor-based system, a first segment of an input signal into a first plurality of frequency bins, the first segment associated with a first time interval;
   detecting, by the processor-based system, the SOI in a first frequency bin included in the first plurality of frequency bins;
   filtering, by the processor-based system, a second segment of the input signal into a second plurality of frequency bins, the second segment associated with a second time interval;

determining, by the processor-based system, movement of the SOI from the first frequency bin to a second frequency bin included in the second plurality of frequency bins, wherein the first frequency bin is different from the second frequency bin; and tracking, by the processor-based system, the SOI based on the movement determination.

15. The method of claim 14, wherein the detection of the SOI comprises evaluating detection conditions that include signal to noise ratio for the SOT, signal to interference ratio for the SOT, amplitude of the SOT, or a combination of these.

16. The method of claim 15, wherein the detection of the SOI is based on evaluation of the detection conditions over a period of multiple time intervals.

17. The method of claim 14, further comprising:

evaluating termination conditions that include signal to noise ratio for the SOI and expiration of a timer, the timer initialized on the detection of the SOT; and determining that the SOI is longer present in one or more frequency bins, based on the evaluated termination conditions.

18. The method of claim 14, wherein the determination of movement of the SOI is based on identifying an increase of signal to noise ratio of the SOI and/or an increase in amplitude of the SOT, in the second frequency bin relative to the first frequency bin.

19. The method of claim 14, wherein the determination of movement of the SOI is based on amplitude and frequency of the SOI in the second bin.

20. The method of claim 14, further comprising creating a composite signal based on the tracking of the SOI over multiple frequency bins over a period of multiple time intervals and combining signal information from those frequency bins.

* * * * *